US006520374B1

(12) United States Patent
Chang

(10) Patent No.: US 6,520,374 B1
(45) Date of Patent: Feb. 18, 2003

(54) CURVY SLIDE DELIVERY CHUTE IN A MACHINE FOR VENDING PRODUCTS

(76) Inventor: Kil Jae Chang, T.PICO Korea Manufacturing, 321-37 Suksu, 2 Dong, Anyang City, Kyungdido (KR)

( * ) Notice: Subject to any disclaimer, the term of this patent is extended or adjusted under 35 U.S.C. 154(b) by 0 days.

(21) Appl. No.: 09/921,226

(22) Filed: Aug. 1, 2001

(51) Int. Cl.[7] .................................................. B65G 59/00

(52) U.S. Cl. ........................ 221/113; 221/121; 221/195; 446/168; 193/2 R; 193/2 D

(58) Field of Search .......................... 446/168; 221/113, 221/121, 194, 195, 24, 155; 193/2 R, 12, 2 D

(56) References Cited

U.S. PATENT DOCUMENTS

| | | | | | |
|---|---|---|---|---|---|
| 1,544,512 | A | | 6/1925 | Weiss | |
| 2,571,521 | A | | 10/1951 | Barnhart | 46/43 |
| 2,726,869 | A | * | 12/1955 | Schulte | 446/168 |
| 2,729,020 | A | | 1/1956 | Frampton | 46/43 |
| 2,729,914 | A | | 1/1956 | Cook | 46/43 |
| 2,772,811 | A | * | 12/1956 | Schaef | 221/155 |
| 3,077,254 | A | | 2/1963 | Goldfrab | 194/80 |
| 3,379,440 | A | * | 4/1968 | Jaffe | 446/168 |
| 4,109,825 | A | * | 8/1978 | Weitzman | 221/122 |
| 5,437,408 | A | | 8/1995 | Chesnut | 232/4 R |
| 5,452,822 | A | | 9/1995 | Haymond | 221/155 |
| 5,782,378 | A | | 7/1998 | Hart et al. | 221/24 |
| 5,788,115 | A | | 8/1998 | Halliburton | 221/155 |
| 5,833,117 | A | | 11/1998 | Kovens et al. | 221/24 |
| 5,897,022 | A | | 4/1999 | Mann | 221/24 |
| 6,056,151 | A | | 5/2000 | Peery et al. | 221/24 |
| 6,394,308 | B1 | * | 5/2002 | Yuyama et al. | 221/121 |

* cited by examiner

*Primary Examiner*—H. Grant Skaggs
(74) *Attorney, Agent, or Firm*—Flanagan & Flanagan; John R. Flanagan

(57) ABSTRACT

A curvy slide delivery chute for use in a machine for vending products includes an elongated body having a central hole formed therein, a pair of recessed channels formed in the body and provided in a wavy longitudinal configuration in the body on opposite sides of the central hole such that the channels are substantially mirror images of one another and protrude below a remainder of the body and extend from an upper end to an opposite lower end of the body such that a product can slide along either one of the channels in being transferred from the upper end to the lower end of the body, and a pair of side rails each formed on the body and protruding thereabove along one of opposite outer sides of the recessed channels.

20 Claims, 5 Drawing Sheets

CURVY SLIDE DELIVERY CHUTE IN A MACHINE FOR VENDING PRODUCTS

BACKGROUND OF THE INVENTION

1. Field of the Invention

The present invention generally relates to coin-operated vending machines and, more particularly, is concerned with a curvy slide delivery chute for employment in a machine for vending products.

2. Description of the Prior Art

One general type of product that is well-known and universally popular and thus desirable to be able to dispense from a vending machine is a lollipop. The lollipop typically has an elongated thin stick-like handle for gripping by a consumer and a piece of candy of spherical, round or similar shape mounted on one end of the handle and covered by a wrapper of paper or the like prior to the purchase of the product by a consumer. Because of its makeup, the lollipop is difficult to store in large quantities in a vending machine and still be able to reliably and effectively dispense one at. a time from the machine.

Vending machines of various constructions have been proposed in the prior art for dispensing a variety of products, such as gumballs. Some representative examples of these prior art vending machines are found in U.S. Pat. No. 3,077,254 to Goldfarb, U.S. Pat. No. 5,452,822 to Haymond, U.S. Pat. No. 5,782,378 to Hart et al., U.S. Pat. No. 5,788,115 to Halliburton, U.S. Pat. No. 5,833,117 to Kovens et al., U.S. Pat. No. 5,897,022 to Mann and U.S. Pat. No. 6,056,151 to Peery et al. Some of these vending machines employ chute structures that define tracks having spiral configurations, while others employ chute structures that define tracks having serpentine and zig-zag or Z-shaped configurations, along which products roll or slide due to gravity from an upper dispensing mechanism to a lower discharge location when the product can be removed by a consumer. While the chute structures of these prior art devices appear to be mostly satisfactory in use for the specific purpose for which they were designed such as to provide an excitement aspect to product movement along a discharge path, the configurations and arrangements of some of the chute structures would appear to allow some products to be thrown off their tracks and thus dislocated and not reach the lower discharge location where products can be removed by consumers.

Consequently, a need still exists for an innovation which will provide a solution to the aforementioned problem in the prior art without introducing any new problems in place thereof.

SUMMARY OF THE INVENTION

The present invention provides a curvy slide delivery chute designed to satisfy the aforementioned need. The curvy slide delivery chute of the present invention when employed in a machine for vending products provides improved guidance and control of downward movement of products on the delivery chute so as to reduce product dislocations but still retain an excitement aspect to the path of product movement which will attract the attention of consumers.

Accordingly, the present invention is directed to a curvy slide delivery chute for use in a machine for vending products. The delivery chute comprises: (a) an elongated body having a central hole formed therein; and (b) a pair of recessed channels formed in the body and provided in a wavy longitudinal configuration in the body on opposite sides of the central hole such that the channels are substantially mirror images of one another and protrude below a remainder of the body and extend from an upper end to an opposite lower end of the body such that a product can slide along either one of the channels in being transferred from the upper end to the lower end of the body. The delivery chute further comprises a pair of side rails each formed on the body and protruding thereabove along one of opposite outer sides of the recessed channels.

The present invention also is directed to a machine for vending products, comprising: (a) a freestanding housing having an upper portion and a lower portion and an intermediate opening therebetween; (b) a product discharge station disposed in the lower portion of the housing; (c) a magazine for storing and dispensing products being disposed in the upper portion of the housing; (d) a magazine indexing drive mechanism disposed in the housing below the magazine and being coupled to the magazine and operable to cause rotation of the magazine; (e) a product separation fixture disposed in the housing below the magazine and coacting therewith so as to cause dispensing the products from the magazine one at a time through the intermediate opening of the housing; (f) an elongated tubular support member disposed in the housing and extending between product discharge station and the intermediate opening of the housing; and (g) a curvy slide delivery chute disposed in the lower portion of the housing between the product discharge station and the intermediate opening of the housing, the delivery chute having a body installed at a relatively steep inclined angle relative to a horizontal reference plane, a central hole defined in the body, and a pair of channels formed in the body on opposite sides of the central hole so as to protrude below a remainder of the body and being of wavy configurations such that the dispensed products can slide downward from the intermediate opening to the product discharge station along either of the channels and past either side of the central hole in the body.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figure 1:
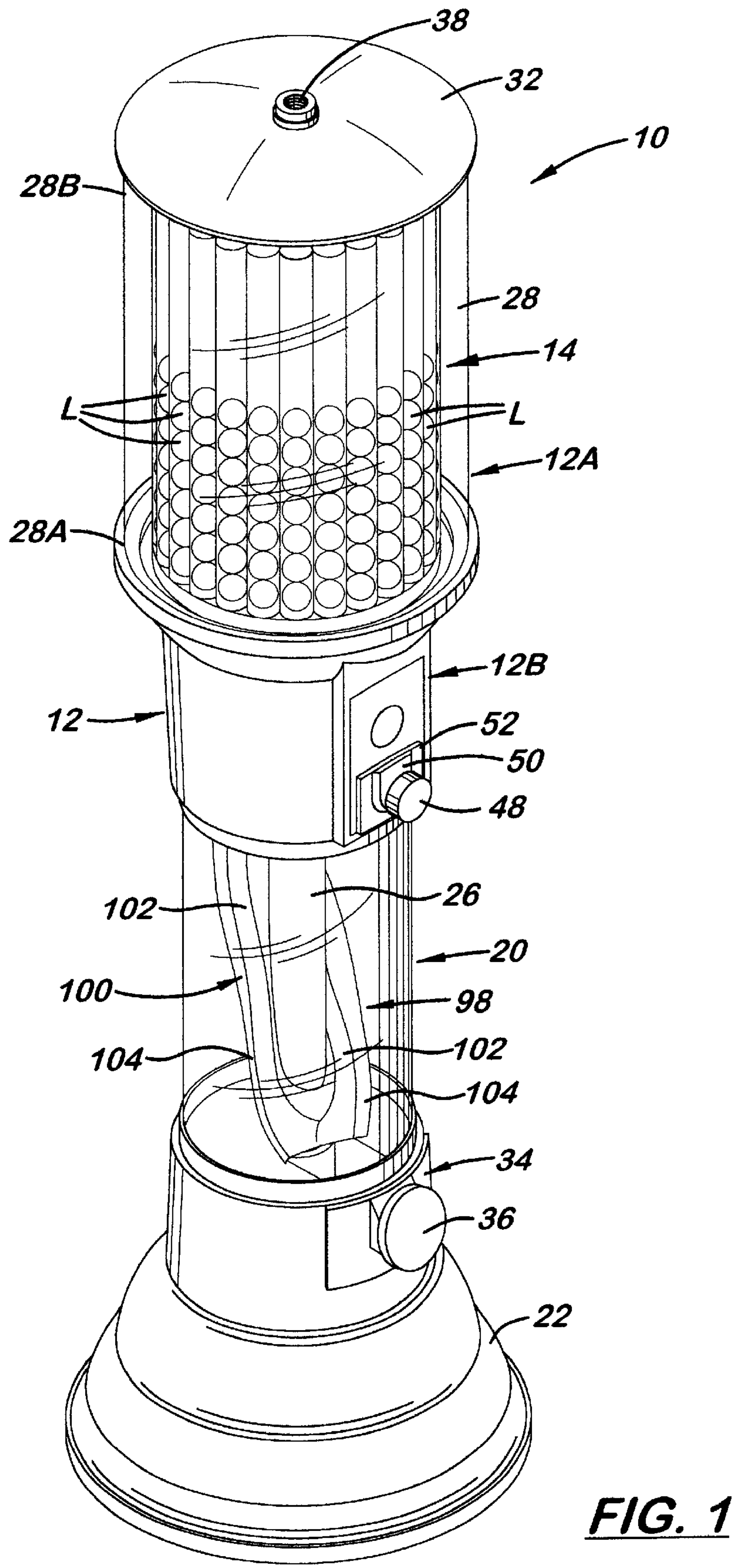
FIG. 1 is a perspective view of a vending machine of the present invention employing a curvy slide delivery chute of the present invention.

Referring to the drawings and particularly to FIGS. 1 to 4, there is illustrated a coin-operated product vending machine, generally designated 10, of the present invention which functions to store and dispense products, such as lollipops L. The machine 10 basically includes a freestanding housing 12 having upper, middle and lower sections 12A, 12B, 12C, a product storage and dispensing magazine 14 disposed in the upper section 12A of the housing 12, a magazine indexing drive mechanism 16 disposed in the upper and middle sections 12A, 12B of the housing 12, a product separation fixture 18 disposed in the middle section 12B of the housing 12, and a product transfer means 20 disposed in the lower section 12C of the housing 12.

Figure 2:
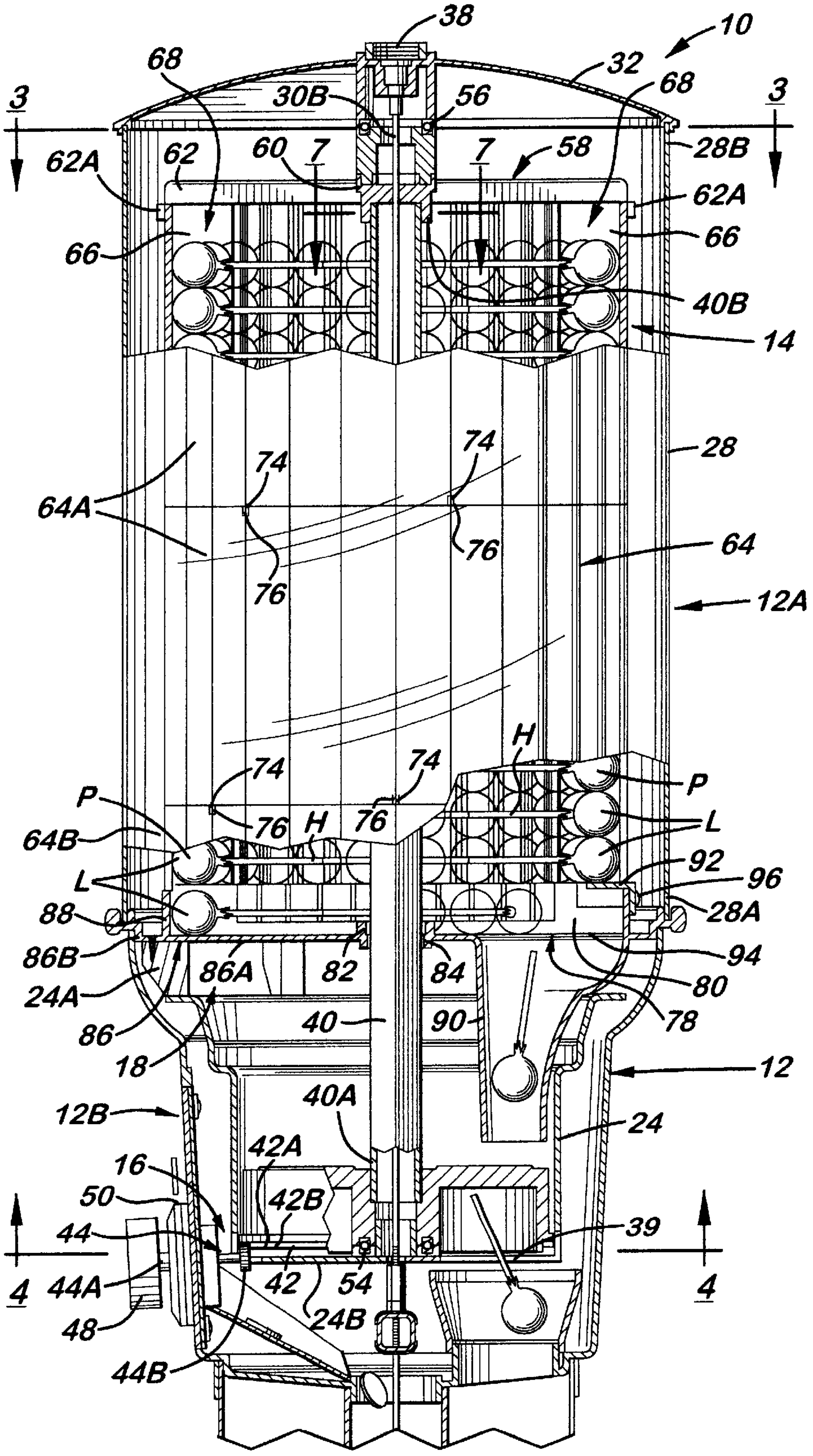
FIG. 2 is an enlarged side elevational view of the machine of FIG. 1 showing some portions broken away and other portions in section.

Referring now to FIGS. 1 and 2, the freestanding housing 12 of the machine 10 also includes a bottom base 22, a middle receptacle or hopper 24, an elongated tubular lower support member 26, an outer tubular enclosure 28, a central elongated rigid tie or connector rod 30, and a top lid 32. The bottom base 22 is located in the lower section 12C of the housing 12 where the housing 12 is supported upon a support surface, such as a floor. The bottom base 22 includes a product discharge station 34 and a pivotal door 36 thereon movable between a closed position and an open position for respective blocking and allowing access to products received by the product discharge station 34. The elongated lower support member 26 is mounted upon the bottom base 22 and extends upwardly through the lower section 12C of the housing 12 and supports the middle hopper 24 in the middle section 12B of the housing 12 in a spaced relationship above the bottom base 22. The outer tubular enclosure 28 is cylindrical in configuration and made of a transparent material, encloses the upper section 12A of the housing 12, and is supported at its open lower end 28A upon an upper periphery 24A of the middle hopper 24. As best seen in FIG. 2, the central rigid tie or connecting rod 30 is fixedly mounted at a lower end 30A to a cross member 22A of the bottom base 22, extends therefrom upwardly through the lower tubular support member 26 of the lower section 12C of the housing 12 and through a bottom panel 24B of the middle hopper 24 of the middle section 12B of the housing 12, and upwardly therefrom through the upper section 12A of the housing 12 to an upper end 30B disposed above an open upper end 28B of the outer tubular enclosure 28. The middle hopper 24 has an opening 39 defined through the bottom panel 24B thereof. The top lid 32 seats upon the upper end 28B of the outer tubular enclosure 28 and is releasably fastened by a suitable conventional key lock mechanism 38 to the upper end 30B of the central rigid connecting rod 30.

Figure 3:
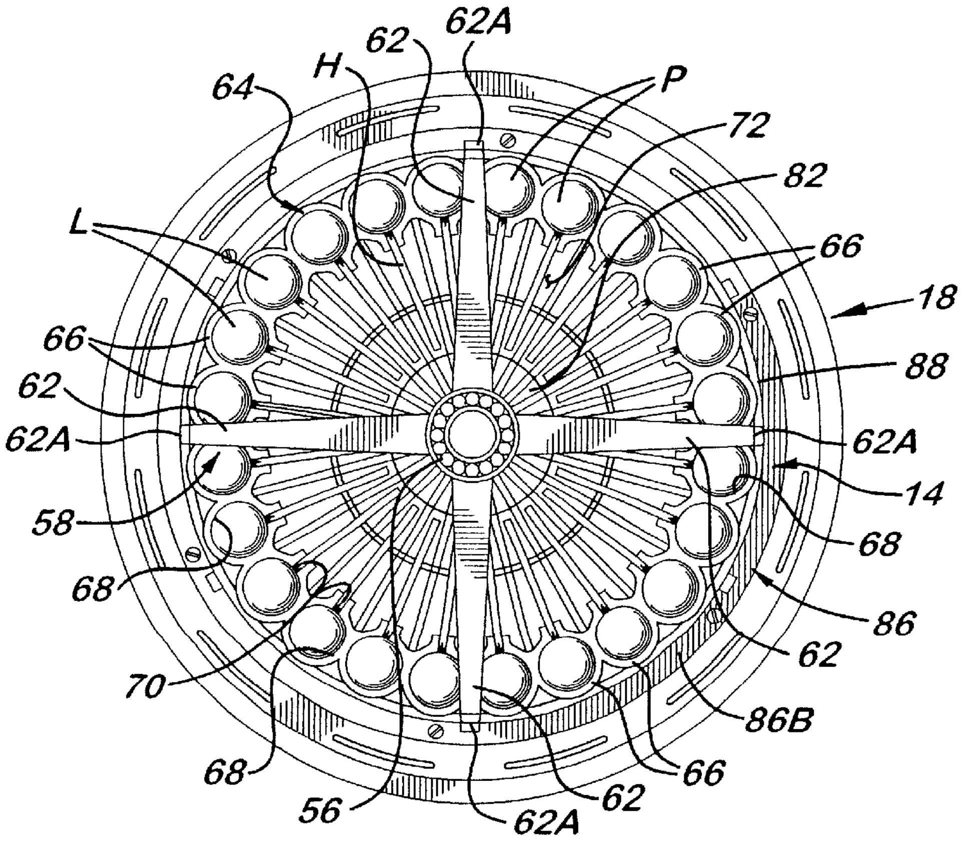
FIG. 3 is a top plan view of the machine as seen along line 3—3 of FIG. 2.
Figure 4:
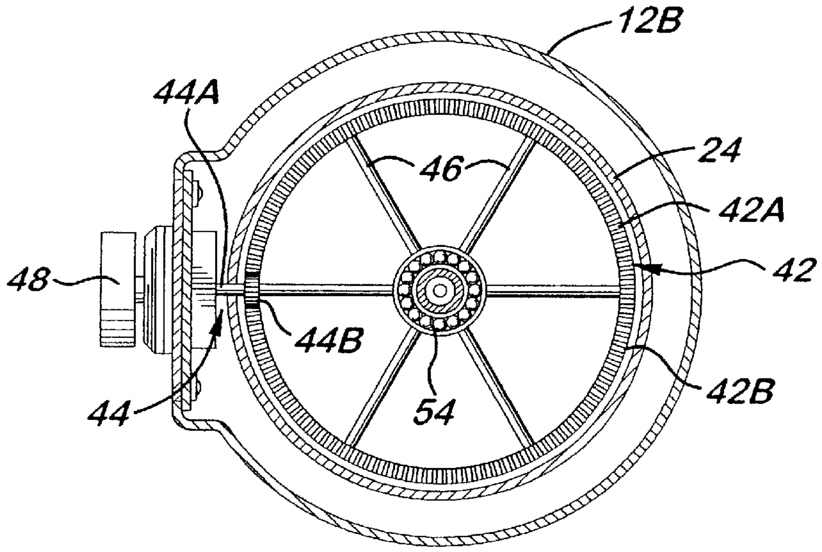
FIG. 4 is a cross-sectional view of the machine taken along line 4—4 of FIG. 2.
Figure 5:
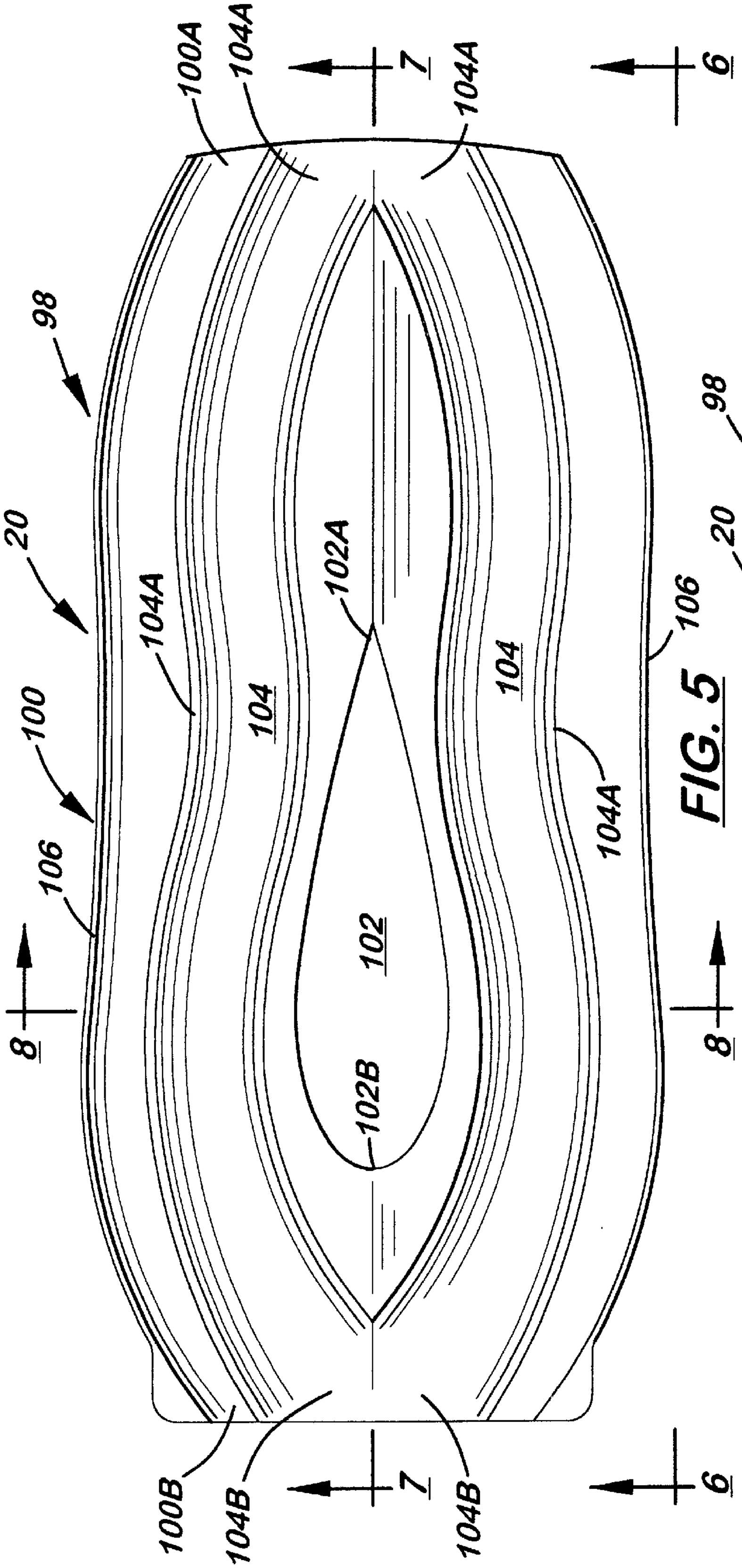
FIG. 5 is an enlarged front elevational view of the delivery chute of the present invention.

Referring now to FIGS. 1–4, the magazine indexing drive mechanism 16 is rotatably supported on the bottom panel 24B of the middle hopper 24 of the housing 12. The magazine indexing drive mechanism 16 includes a rigid central hollow vertical driven shaft 40 having opposite lower and upper ends 40A, 40B, a horizontal annular driven gear 42 having teeth 42A arranged in a circular row and projecting downwardly from a bottom side 42B (as seen in FIGS. 2 and 4) of the driven gear 42, and a peripherally-located drive gear 44 having a drive shaft 44A and teeth 44B defined circumferentially about the drive shaft 44A of the drive gear 44 and projecting radially outward therefrom. The central rod 30 of the housing 12 extends vertically through the central hollow vertical driven shaft 40 of the drive mechanism 16. The annular driven gear 42 encircles and is spaced radially outwardly from the lower end 40A of the driven shaft 40 by a plurality of members in the form of radial spokes 46 extending between and rigidly interconnecting the annular driven gear 42 and driven shaft 40. The teeth 44A of the drive gear 44 mesh with the teeth 42A in the circular row thereof on the bottom side 42B of the driven gear 42 which faces toward the bottom panel 24B of the middle hopper 24. The outer end of the drive shaft 44A of the drive gear 44 mounts a knob 48 at the exterior of the middle hopper 24 for rotation with the drive shaft 44A when turned by a user after inserting a coin into a coin slot 50 of a conventional coin deposit station 52 supported by the middle hopper 24 of the machine 10.

The magazine indexing drive mechanism 16 also includes lower and upper annular bearings 54, 56 and an upper spider 58. The lower and upper annular bearings 54, 56 are disposed respectively at the lower and upper ends 40A, 40B of the central driven shaft 40. The lower bearings 54 rotatably mount and support the driven shaft 40 upon the bottom panel 24B of the middle hopper 24 and enable the driven shaft 40 and the driven and drive gears 42, 44 to be rotated by a user merely turning the knob 48. The upper spider 58 has a central hub 60 and a plurality of radial arms 62 angularly spaced apart about ninety degrees and rigidly attached to and extending radially outwardly from the hub 60. The hub 60 is received over the upper end 40B of the central vertical hollow driven shaft 40 and fixedly attached thereto such that the upper spider 58 will rotate with the driven shaft 40. The radial arms 62 of the upper spider 58 have respective lugs 62A on the outer ends thereof which extend downwardly and interfit with portions of the upper periphery of the product storage and dispensing magazine 14 so as to transmit the rotational motion of the driven shaft 40 and upper spider 58 to the magazine 14. The upper annular bearing 56 is disposed between the central hub 60 of the upper spider 58 and the top lid 32.

Referring now to FIGS. 1–3, the product storage and dispensing magazine 14 is rotatably supported upon the bottom panel 24B of the middle hopper 24 of the housing 12. The magazine 14 includes means in the form of a generally cylindrical body 64 having a plurality of partitions 66 being vertically arranged and spaced circumferentially about and fixedly attached one to the next so as to define a circular row of vertical channels 68 of the magazine 14 having upper and lower open ends 68A, 68B. The products, such as lollipops L, can be stored in the circumferentially-arranged vertical channels 68 one above the next to form circularly-arranged vertical columns of the products. The partitions 66 of the magazine body 64 also define vertical slots 70 along their inner edges 66A which face toward one another and open into a central interior cylinder of space 72 within the magazine body 64 and also into the vertical channels 68. Head pieces P of the lollipops L are disposed in circularly-arranged columns thereof within the vertical channels 68 with their handles H extending inwardly toward the driven shaft 40 through the slots 70 such that each lollipop L is generally disposed in a horizontal orientation. Because of their vertical orientations, the columns of lollipops L will tend to move and feed downward through the open lower ends 68B of the vertical channels 68 due solely to the influence of the force of gravity and without the need for application of any supplemental mechanical force thereto. The magazine body 64 is made of a suitable transparent material such that the products can be seen both through the body 64 of the magazine 14 and the outer tubular enclosure 28 of the housing 12.

The magazine body 64 is disposed in a concentric relationship about the central driven shaft 40 and preferably is made up of a plurality of subunits or segments 64A, 64B which fit together end-to-end and thus stack one on top of another to form the body 64. This reduces the handling weight of the magazine 14 for persons who must lift the magazine during resupplying or replenishing of lollipops in the machine 10. The segments 64A have complementary male and female elements 74, 76 at the opposite ends thereof which interfit to retain the segments 64A, 64B together in the end-to-end stacked relationship.

The lowermost one of the segments 64B of the magazine body 64 is different from the other segments 64A in that segment 64B has a lower structure 78 rigidly attached to and disposed below the partitions 66 of the segment 64B. The lower structure 78 includes a plurality of radially outwardly directed divider tabs 80, as seen in FIG. 2, being circumferentially spaced apart from one another and also spaced below and between the lower open ends 68B of the vertical channels 68 and defining compartments 81 between the divider tabs 80 which respectively receive therein the lowermost products which then make up a lowermost circular row of the products. The lower structure 78 also includes a bottom central hub 68 which defines a central hole 84 adapted to receive therethrough the central driven shaft 40. Preferably, both the driven shaft 40 and central hole 84 have a similar rectangular shape such that rotation of the central driven shaft 40 will impose a rotational force on the magazine body 64 via the bottom central hub 82 of the bottom structure 78 of the lowermost segment 64B that will assist or augment the rotational force applied on the upper periphery of the magazine body 64 by the lugs 62A on the radial arms 62 of the upper spider 58 in causing the rotation of the magazine body 64 merely by a user turning of the knob 48. Also, each time the user turns the knob 48 of the coin deposit station 52 after inserting a coin in the coin slot 50 thereof, the drive gear 44 rotates through an angular displacement sufficient to move or index the driven gear 42 through an angular distance equal to the center-to-center distance between the vertical channels 68 and thus between the vertical columns of lollipops L. By way of example, there are twenty-four vertical channels 68. Thus, the magazine 14 is rotatably indexed through an angular displacement equal to one twenty-fourth of its circumference each time the knob 48 is turned to cause the vending of a lollipop L.

Referring to FIG. 2, the product separation fixture 18 is mounted on and about the upper periphery 24A of the middle receptacle or hopper 24 of the housing 12. The magazine body 64 at the lower structure 78 of its lowermost segment 64B rests upon the separation fixture 18 such that the magazine 14 is rotatably supported thereon and can be rotated relative to the separation fixture 18. The separation fixture 18, more particularly, basically includes a circular platform 86, an upstanding annular fence or wall 88, a funnel 90 and a barrier plate 92.

The circular platform 86 of the fixture 18 has an inner main portion 86A and an outer peripheral rim portion 86B supported on the upper periphery 24A of the middle hopper 24 of the housing 12 such that the inner main portion 86A of the platform 86 is disposed in a horizontal orientation somewhat below the elevation of the upper periphery 24A of the middle hopper 24. The upstanding annular wall 88 of the fixture 18 is fixed upright upon the circular platform 86 adjacent to the outer peripheral rim portion 86B thereof and outwardly of and adjacent to the open lower ends 68B of the vertical channels 68 and to the divider tabs 89 of the lowermost segment 64B of the magazine body 64 so as to permit the magazine 14 to be rotated without interference from the annular wall 88 and with the vertical channels 68 located inside the annular wall and thus aligned with and disposed above the inner main portion 86A of the circular platform 86 such that the lowermost ones of the products in the vertical columns thereof will rest upon the inner main platform portion 86A within the respective compartments 82 between the divider tabs 80 and adjacent to the annular wall 88 and be moved therealong by the divider tabs 80 with rotation of the magazine 14.

The funnel 90 of the fixture 18 is attached on and depends below the inner main portion 86A of the circular platform 86 so as to define a passageway 94 therethrough. The funnel 90 is disposed above and aligned with the opening 39 of the middle hopper 24 of the housing 12 such that products advanced by rotation of the magazine 14 to the platform passageway 94 will fall downward through the funnel 90 and therefrom directly to and through the opening 39 of the middle hopper 24 of the housing 12 and therefrom via the product transfer means 20 to the product discharge station 34 of the lower section 12C of the housing 12. Also, the bottom central hub 82 of the bottom structure 78 of the lowermost segment 64B of the magazine body 64 extends below the rest of the bottom structure 78 so as to create clearance between the rest of the bottom structure 78 and circular platform 86 which prevents a handle H from wedging therebetween and causing a jamming of the rotation of the magazine 14 relative to the circular platform 86 of the separation fixture 18.

The barrier plate 92 is mounted such as by fasteners 96 to an arcuate segment of the upstanding annular wall 88 and extends inwardly from the top 88A of the wall 88 in a horizontal orientation parallel to and spaced above the inner main portion 86A of the circular platform 86 such that the barrier plate 92 is spaced directly above the passageway 94 through the inner main portion 86A of the circular platform 86. The barrier plate 92 thus overlies and blocks a direct vertical path to the platform passageway 94 of products from those of the vertical columns thereof located directly above the passageway 94 while still allowing dropping of other products angularly displaced from the location of the barrier plate 92 into the lowermost circular row of the products lying on the inner main portion 86A of the platform 86 and movement of the lowermost products one at a time to below the barrier plate 92 and into the passageway 94. As seen in FIG. 2, the lower ends 68A of the vertical channels 68 of the lowermost segment 64B of the magazine body 64 are disposed at an elevation above the barrier plate 92 of the separation fixture 18 and thus pass over the barrier plate 92 upon rotation of the magazine 14 whereas the divider tabs 80 of the lower structure 78 of the lowermost segment 64B of the magazine body 64 are disposed at an elevation below the barrier plate 92 and thus pass under the barrier plate 92 upon rotation of the magazine 14. Each of the divider tabs 80 is spaced a sufficient distance below the elevation of the barrier plate 92 so as to eliminate the possibility of the wrapper of the product from wedging or catching between divider tab 80 and the barrier plate 92 and thereby preventing the product from dropping into the passageway 94.

Figure 6:
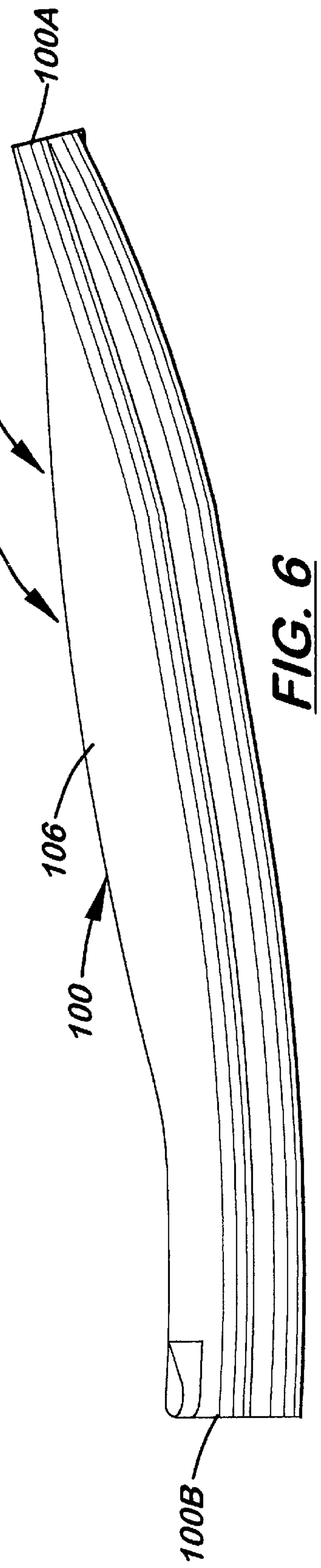
FIG. 6 is a side elevational view of the delivery chute as seen along line 6—6 of FIG. 5.
Figure 7:
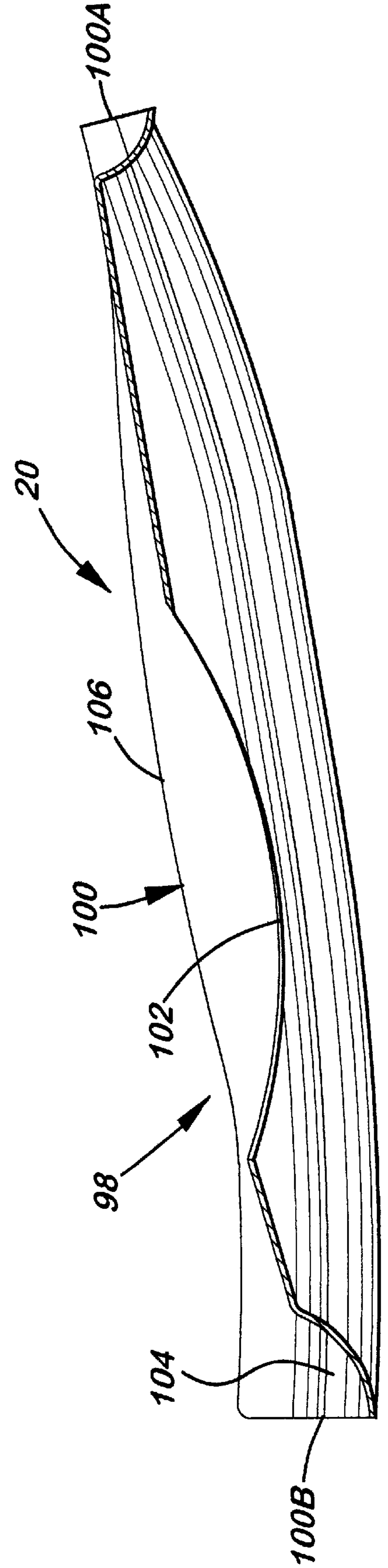
FIG. 7 is a longitudinal sectional view of the delivery chute taken along line 7—7 of FIG. 5.
Figure 8:
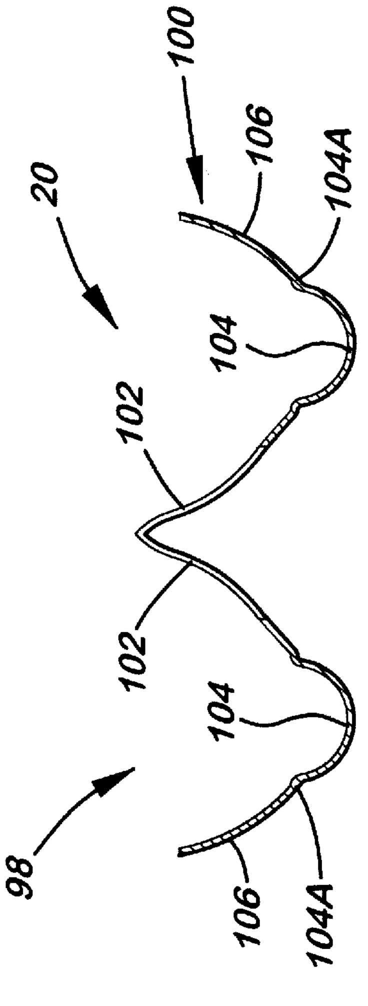
FIG. 8 is a cross-sectional view taken of the delivery chute taken along line 8—8 of FIG. 5.

Referring now to FIGS. 1, 2 and 5–8, the product transfer means 20 extends upwardly from the product discharge station 24 to the product separation fixture 18 of the middle section 12B of the frame 12. The product transfer means 20 takes the form of a curvy slide delivery chute 98. The delivery chute 98 includes an elongated body 100 having an overall shallow arcuate longitudinal configuration, as best seen in FIGS. 6 and 7, and a W-shaped cross-sectional configuration, as best seen in FIG. 8. The body 100 preferably is made of a suitable plastic material, is installed at a relatively steeply-inclined angle, as seen in FIG. 2, and has a central teardrop-shaped central hole 102 formed therein which receives therethrough the lower tubular support member 26 of the housing 12. The teardrop-shaped hole 102 has a pointed upper end 102A and a rounded lower end 102B.

The body 100 of the delivery chute 98 includes a pair of recessed channels 104, integrally formed therein, which extend between upper and lower ends 100A, 100B of the body 100 and are provided in a wavy or curvy longitudinal configuration in the body 100 on a pair of opposite sides of the central hole 102. The channels 104 protrude below the rest of the body 100 and extend from the upper end 100A to the opposite lower end 100B of the body 100 such that a product can slide downward along either one of the channels 104 in being transferred from the opening 39 in the middle hopper 24 to the lower discharge station 34 of the machine 10. The channels 104, being substantially mirror images of one another, merge together at their inlet and outlet ends 104A, 104B located at the upper and lower ends 100A, 100B of the body 100 and thus encompass a central portion 100C of the body 100 which surrounds the central opening 102 therein. The central portion 100C of the body 100 has a generally inverted V-shaped configuration as seen in FIG. 8. The channels 104 along which the dispensed products slide by having the wavy or curvy longitudinal configurations cause the products to move along identically shaped paths and thus provide the motion of the products with an entertainment aspect which will attract the attention of consumers.

The body 100 of the delivery chute 98 further includes a pair of side rails 106, each being integrally formed on the body 100 and protruding thereabove along one of the opposite outer sides 104A of the recessed channels 104. The side rails 106 function so as to reduce the possibility of dislocation of a product outwardly from their paths of movement down the slide channels 104 of the body 100 of the delivery chute 98.

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

I claim:

1. A curvy slide delivery chute for use in a machine for vending products, said chute comprising:

(a) an elongated body having a central hole formed therein;

(b) a pair of recessed channels formed in said body and provided in a wavy longitudinal configuration in said body on opposite sides of said central hole, said channels protruding below a remainder of said body and extending from an upper end to an opposite lower end of said body such that a product can slide along either one of said channels in being transferred from said upper end to said lower end of said body.

2. The chute of claim 1 wherein said body has a shallow arcuate longitudinal configuration.

3. The chute of claim 1 wherein said body has a W-shaped cross-sectional configuration.

4. The chute of claim 1 wherein said central hole has teardrop-shaped configuration with a pointed upper end and a rounded lower end.

5. The chute of claim 1 wherein said channels are substantially mirror images of one another.

6. The chute of claim 1 wherein said channels have upper inlet ends and lower outlet ends, said upper inlet ends of said channels merging together at an upper end of said body and said lower outlet ends of said channels merging together at a lower end of said body such that said channels encompass a central portion of said body which, in turn, surrounds said central hole therein.

7. The chute of claim 1 wherein said central portion of said body has a generally inverted V-shaped configuration.

8. The chute of claim 1 further comprising:

(c) a pair of side rails each formed on said body and protruding thereabove along one of opposite outer sides of said recessed channels.

9. A curvy slide delivery chute for use in a machine for vending products, said chute comprising:

(a) an elongated body having an overall shallow arcuate longitudinal configuration and having a central hole formed therein;

(b) a pair of recessed channels integrally formed in said body and provided in a wavy longitudinal configuration in said body on opposite sides of said central hole, said channels protruding below a remainder of said body and extending from an upper end to an opposite lower end of said body such that a product can slide along either one of said channels in being transferred from said upper end to said lower end of said body, said channels being substantially mirror images of one another and having upper inlet ends and lower outlet ends, said upper inlet ends of said channels merging together at said upper end of said body and said lower outlet ends of said channels merging together at said lower end of said body such that said channels encompass a central portion of said body which, in turn, surrounds said central hole therein; and (c) a pair of side rails each integrally formed on said body and protruding thereabove along one of opposite outer sides of said recessed channels.

10. The chute of claim 9 wherein said body has a W-shaped cross-sectional configuration.

11. The chute of claim 9 wherein said central hole has teardrop-shaped configuration with a pointed upper end and a rounded lower end.

12. The chute of claim 9 wherein said central portion of said body has a generally inverted V-shaped configuration.

13. A machine for vending products, comprising:

(a) a freestanding housing having an upper portion and a lower portion and an intermediate opening therebetween;

(b) a product discharge station disposed in said lower portion of said housing;

(c) a magazine for storing and dispensing products being disposed in said upper portion of said housing;

(d) a magazine indexing drive mechanism disposed in said housing below said magazine and being coupled to said magazine and operable to cause rotation of said magazine;

(e) a product separation fixture disposed in said housing below said magazine and coacting therewith so as to cause dispensing the products from said magazine one at a time through said intermediate opening of said housing;

(f) an elongated tubular support member disposed in said housing and extending between product discharge station and said intermediate opening of said housing; and (g) a curvy slide delivery chute disposed in said lower portion of said housing between said product discharge station and said intermediate opening of said housing, said delivery chute having a body installed at a relatively steep inclined angle relative to a horizontal reference plane, a central hole defined in said body, and a pair of channels formed in said body on opposite sides of said central hole so as to protrude below a remainder of said body and being of wavy configurations such that the dispensed products can slide downward from said intermediate opening to said product discharge station along either of said channels and past either side of said central hole in said body.

14. The machine of claim 13 wherein said body of said chute has a shallow arcuate longitudinal configuration.

15. The machine of claim 13 wherein said body of said chute has a W-shaped cross-sectional configuration.

16. The machine of claim 13 wherein said central hole in said body of said chute has teardrop-shaped configuration.

17. The machine of claim 13 wherein said channels in said body of said chute are substantially mirror images of one another.

18. The machine of claim 13 wherein said channels in said body of said chute have upper inlet ends and lower outlet ends, said upper inlet ends of said channels merging together at an upper end of said body and said lower outlet ends of said channels merging together at a lower end of said body such that said channels encompass a central portion of said body which, in turn, surrounds said central hole therein.

19. The machine of claim 18 wherein said central portion of said body of said chute has a generally inverted V-shaped configuration.

20. The machine of claim 13 wherein said chute further includes a pair of side rails each formed on said body and protruding thereabove along one of opposite outer sides of said recessed channels.

* * * * *